(12) United States Patent
Yim et al.

(10) Patent No.: US 7,263,706 B2
(45) Date of Patent: Aug. 28, 2007

(54) DISK CARTRIDGE AND DISK PLAYER USING THE SAME

(75) Inventors: Hong-kyun Yim, Suwon (KR); Han-kook Choi, Suwon (KR); Yong-hoon Lee, Suwon (KR); Chong-sam Chung, Suwon (KR); Jae-yong Eum, Suwon (KR); Takizawa Teruyuki, Neyagawa (JP); Saii Yoshito, Nishinomiya (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 10/367,739

(22) Filed: Feb. 19, 2003

(65) Prior Publication Data

US 2003/0156533 A1 Aug. 21, 2003

Related U.S. Application Data

(60) Provisional application No. 60/357,102, filed on Feb. 19, 2002.

(51) Int. Cl.
G11B 23/03 (2006.01)
G11B 17/03 (2006.01)

(52) U.S. Cl. ............. 720/728; 720/741; 720/710
(58) Field of Classification Search ............. 720/723, 720/719, 721, 741, 728, 710, 732, 734
See application file for complete search history.

(56) References Cited

U.S. PATENT DOCUMENTS 4,609,105 A * 9/1986 Manes et al. ............ 206/308.3

| | | | |
|---|---|---|---|
| 4,669,078 A * | 5/1987 | Ogusu ............. | 720/735 |
| 4,847,826 A * | 7/1989 | Sakaguchi et al. ........ | 720/723 |
| 5,537,389 A | 7/1996 | Kuwa et al. ............ | 360/133 |
| 5,579,297 A * | 11/1996 | Childers et al. ........ | 720/735 |
| 5,717,684 A * | 2/1998 | Akiyama et al. ........ | 720/728 |

(Continued)

FOREIGN PATENT DOCUMENTS

CN 1318839 10/2001

(Continued)

OTHER PUBLICATIONS

U.S. Appl. No. 10/369,130, filed Feb. 20, 2003, Eum et al., Samsung Electronics Co., Ltd.

(Continued)

*Primary Examiner*—Brian E. Miller
(74) *Attorney, Agent, or Firm*—Stein, McEwen & Bui, LLP

(57) ABSTRACT

A disk cartridge includes a case accommodating a disk, a cover installed at the case to be capable of being open and shut and having a hole formed thereon to be open to an outside of the cover, a shutter installed under the disk in the case to be capable of moving to open and shut an opening formed on the case, and a clamping member installed at the cover to seal the hole to clamp the disk. Thus, since the clamping member blocks the hole of the cover connected to the outside of the cover, possibility of intrusion of dust into the disk cartridge is reduced. Also, since there is no need to install the clamping member at the disk drive, the disk drive can be made simplified and slim.

6 Claims, 14 Drawing Sheets

U.S. PATENT DOCUMENTS

| | | | |
|---|---|---|---|
| 5,793,742 A | 8/1998 | Sandell et al. | 360/133 |
| 5,859,834 A * | 1/1999 | Takahashi et al. | 720/723 |
| 6,700,741 B2 | 3/2004 | Inoue et al. | |
| 6,728,199 B2 | 4/2004 | Obata et al. | |

FOREIGN PATENT DOCUMENTS

| | | |
|---|---|---|
| CN | 1335615 | 2/2002 |
| EP | 0 651 390 | 5/1995 |
| JP | 11-339425 | 12/1999 |
| JP | 2001-105216 | 4/2001 |
| KR | 1988-10410 | 10/1988 |
| KR | 10-268255 | 7/2000 |
| WO | WO94/23431 | 10/1994 |
| WO | 02/056313 | 7/2002 |

OTHER PUBLICATIONS

U.S. Appl. No. 10/339,412, filed Jan. 10, 2003, Yim et al., Samsung Electronics Co., Ltd.

Supplementary European Search Report issued Sep. 25, 2006 by the European Patent Office re: European Patent Application No. 03705441 (4 pp).

Chinese Office Action issued May 12, 2006 re: Chinese Patent Application No. 03808689.1 (14 pp).

* cited by examiner

DISK CARTRIDGE AND DISK PLAYER USING THE SAME

CROSS-REFERENCE TO RELATED APPLICATIONS

This application claims the benefit of U.S. Provisional Application No. 60/357,102, filed Feb. 19, 2002, in the United States Patent and Trademark Office, the disclosure of which is incorporated herein by reference.

BACKGROUND OF THE INVENTION

1. Field of the Invention

The present invention relates to a disk cartridge protecting a recording surface of an accommodated disk that is an information recording/reproduction medium, from contaminants, such as dust or a fingerprint, and particularly, to a disk player using a disk cartridge having a case having an opening, a shutter opening/shutting the opening of the case, a cover covering the case, and a disk disposed between the shutter and the cover.

2. Description of the Related Art

In general, a disk cartridge accommodates a disk that is an information recording/reproduction medium and is installed in a disk drive. As shown in FIG. 1, a conventional disk cartridge 100 includes a case 101 accommodating a disk D, a shutter 110 installed in the case 101 to be capable of rotating to selectively open and shut an opening 102 formed on the case 101 so that a pickup (not shown) of a disk drive can access the disk D, and a cover 103 fixed to an upper portion of the case 101. The cover 103 includes a hole 103b formed in the cover 103 for disk exchange and clamping, and an escape prevention lever 103a installed at the cover 103 to be capable of sliding along a side of the cover to prevent the disk D from escaping through the hole 103b. Thus, when the disk D is installed in the disk cartridge, the escape prevention lever 103a is pulled back not to interfere with the disk D. After the disk installation is completed, the escape prevention lever 103a is pushed forward so that an end portion of the escape prevention lever 103a prevents the disk D from escaping through the hole 103b.

When the disk cartridge 100 accommodating the disk D is inserted into a disk drive as shown in FIG. 2A, an opening lever 120 installed at the disk drive pushes a locking piece 111a so that a protrusion 111c of the shutter 110 is unlocked from a groove 101a of the case 101. Then, the opening lever 120 pushes an interference piece 111b to have the shutter 110 pivot around left and right pivot axles 110a. The shutter 110 is formed of first and second shutter portions 111 and 112 respectively installed to be capable of pivoting around corresponding ones of the left and right pivot axles 110a and engaging each other through an engagement gear portion 113. As the first shutter portion 111 incorporated with the interference piece 111b rotates clockwise, the second shutter portion 112 rotates counterclockwise so that the first and second shutter portions 111 and 112 are separated apart from each other to open the opening 102. Then, a turntable (not shown) and a damper (not shown) of the disk drive enter the opening 102 and the hole 103a to clamp the disk D. A pickup (not shown) accesses a recording surface of the disk D to perform an information recording and/or reproducing process. Although not shown in the drawings, a torsion spring elastically biasing the first shutter portion 111 in a counterclockwise direction on the drawings, that is, in a direction to close the opening 102, is installed between the first shutter portion 111 and a bottom surface of the case 101. When a force applied by the opening lever 120 is removed, the shutter 110 is returned to an original closed position.

However, in the above structure, dust can intrude through the open hole 103b of the cover 103. Of course, since an upper surface of the disk D facing the hole 103b is not a surface for recording, direct contamination due to the dust does not occur. Nonetheless, when the dust is introduced and placed on the shutter 110, the dust disposed on the shutter 110 adheres to the recording surface of the disk D during an opening/shutting operation. Also, even if not necessarily caused by use of the shutter 110, there is a high possibility that the recording surface of the disk D is contaminated by the dust.

Furthermore, since the shutter 110 is installed in the case 101, and the disk D is placed on the shutter 110 during the opening/shutting operation of the shutter 110, the shutter 110 contacts the recording surface of the disk D (a lower surface of a disk in the drawings) so that the recording surface of the disk D may be scratched and damaged by the shutter 110.

Also, in the above structure, when the shutter 110 is pressed hard through the opening 102 in a state in which the shutter 110 is closed, the shutter 110 is easily deformed. That is, since each of the first and second shutter portions 111 and 112 is supported by the case 101 through one end thereof being coupled to be capable of pivoting around the pivot axle 110a, when a user presses the other end of the shutter 110 through the opening 102, the shutter 110 is easily deformed. As a result, the opening/shutting operation is not performed properly. Even if the opening/shutting operation is properly performed, a gap may be formed between the first and second shutter portions 111 and 112 which may be prevented from performing a function as a shutter.

Therefore, an improved structure is needed to prevent deformation of the shutter 110 and introduction of the dust while the recording surface of a disk is protected.

SUMMARY OF THE INVENTION

To solve the above and/or other problems, it is an aspect of the present invention to provide an improved disk cartridge preventing dust from being introduced into a case, protecting a recording surface of a disk during the opening/shutting operation of a shutter, and preventing deformation of the shutter due to an external force to keep the disk more stably.

Additional aspects and advantages of the invention will be set forth in part in the description which follows and, in part, will be obvious from the description, or may be learned by practice of the invention.

To achieve the above and/or other aspects of the invention, a disk cartridge includes a case accommodating a disk, a cover installed at the case to be capable of being open and shut and having an hole formed thereon and being open to an outside of the cover, a shutter installed under the disk in the case to be capable of moving to open/shut an opening formed on the case, and a clamping member installed at the cover to seal the hole and clamp the disk.

To achieve the above and/or other aspects of the invention, a disk cartridge includes a case accommodating a disk, a cover installed on an upper surface of the case to be capable of being open and shut to seal an upper surface of the case, a shutter installed under the disk in the case to be capable of moving to open/shut an opening formed on the case, and a clamping member installed on an inner surface of the cover to clamp the disk.

BRIEF DESCRIPTION OF THE DRAWINGS

The above and/or other aspects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
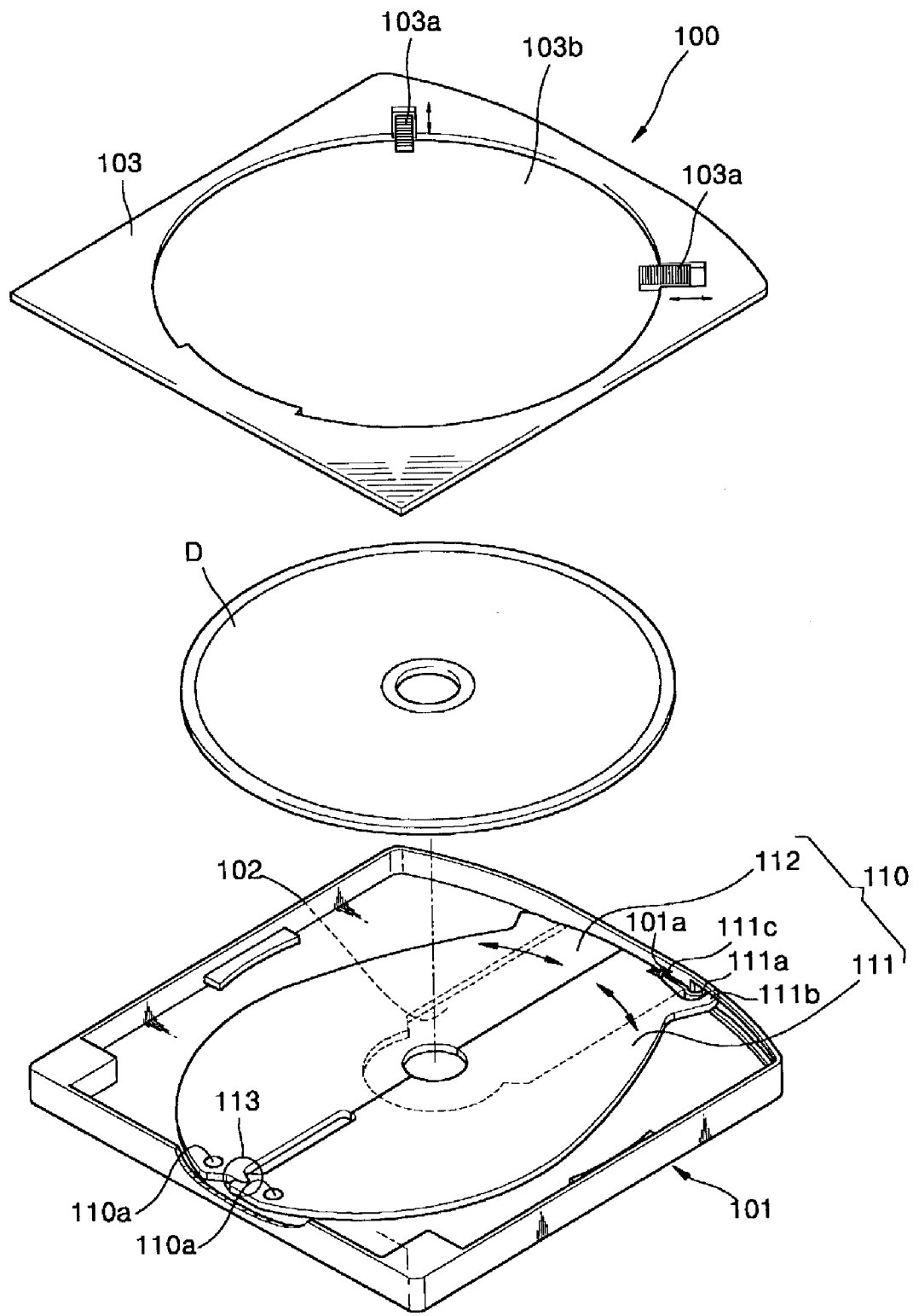
FIG. 1 is a perspective view of a conventional disk cartridge.
Figure 2A:
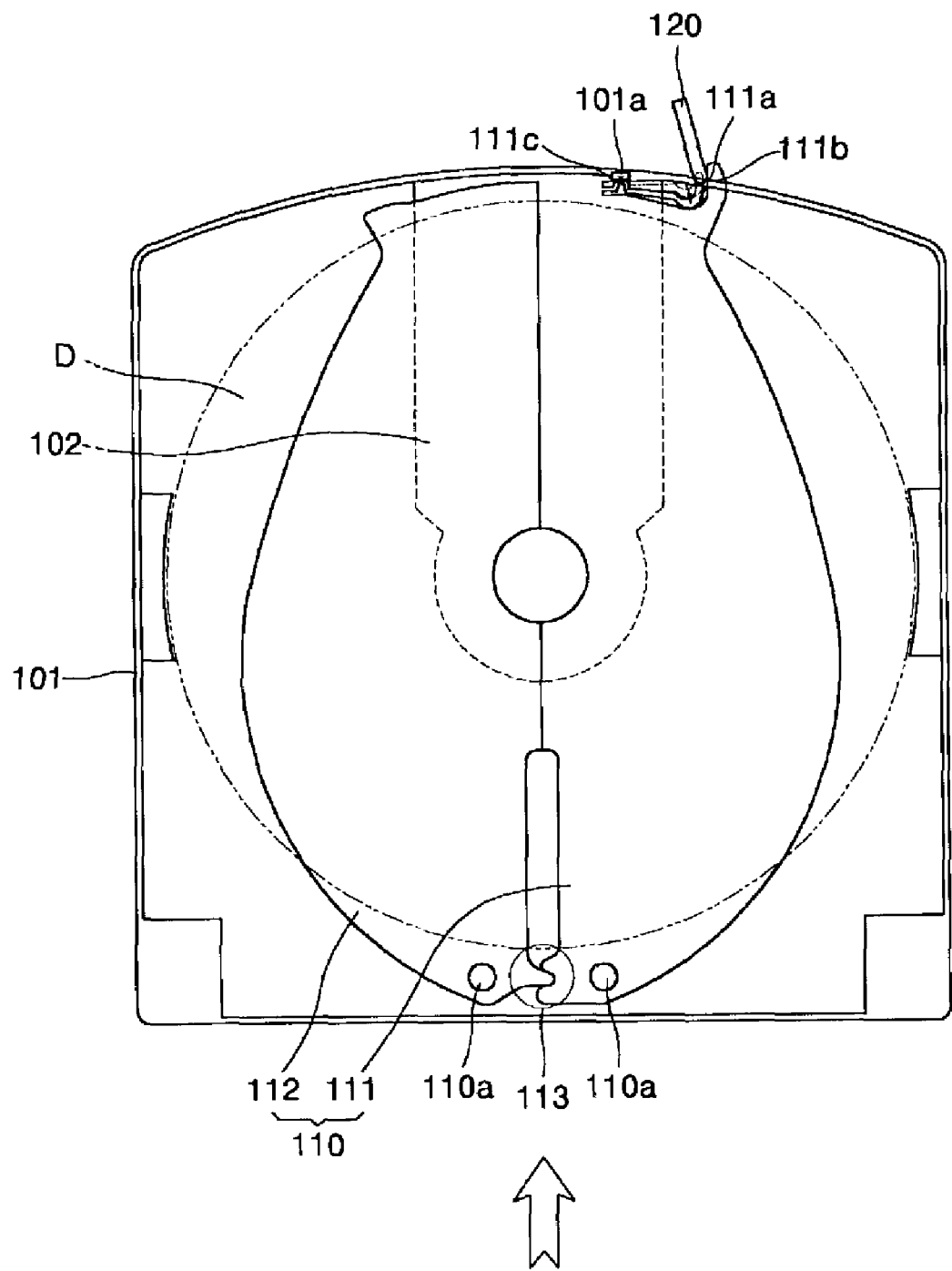
FIGS. 2A and 2B are views showing a state of opening/shutting of a shutter of the disk cartridge shown in FIG. 1.
Figure 2B:
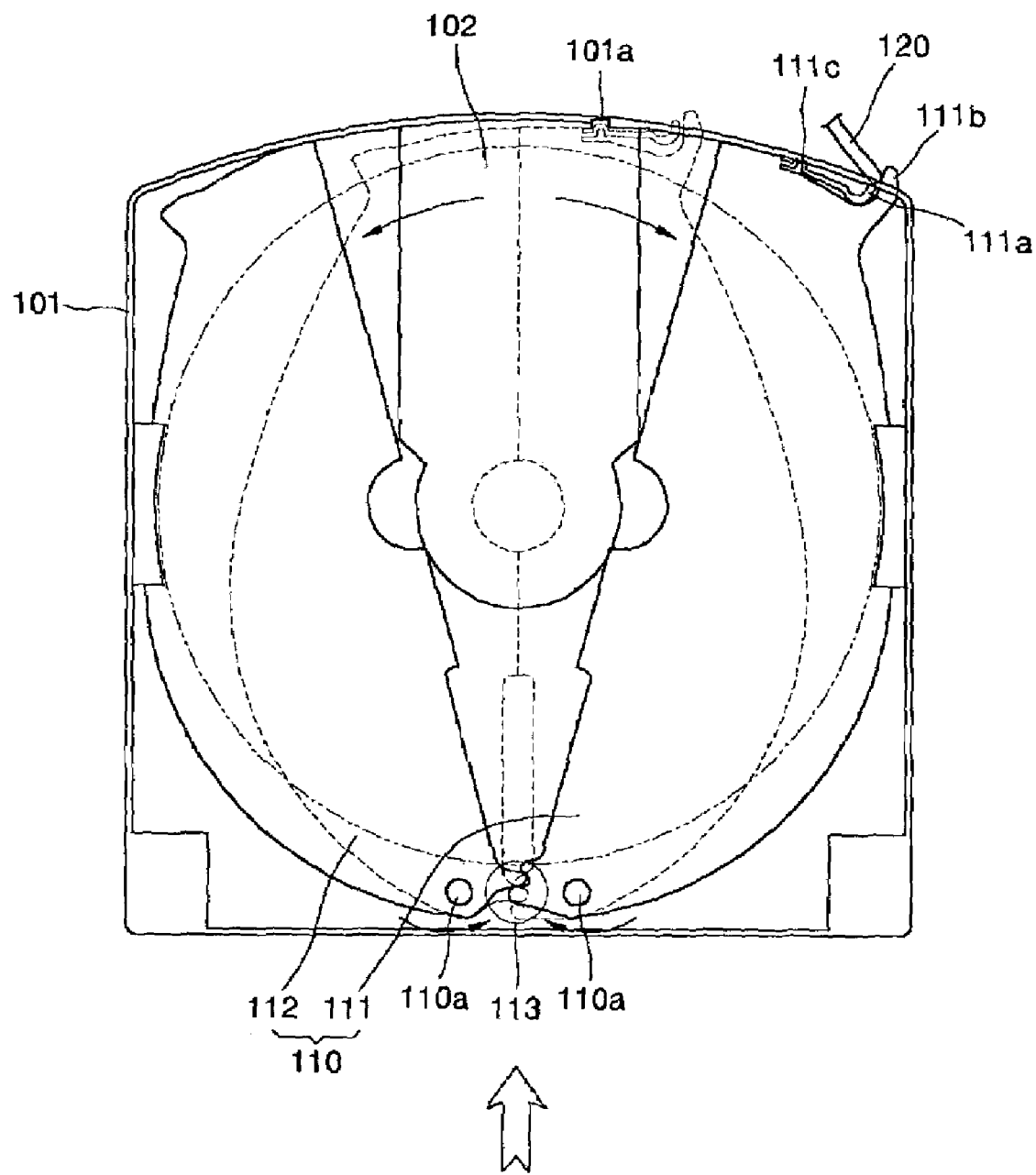

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 3:
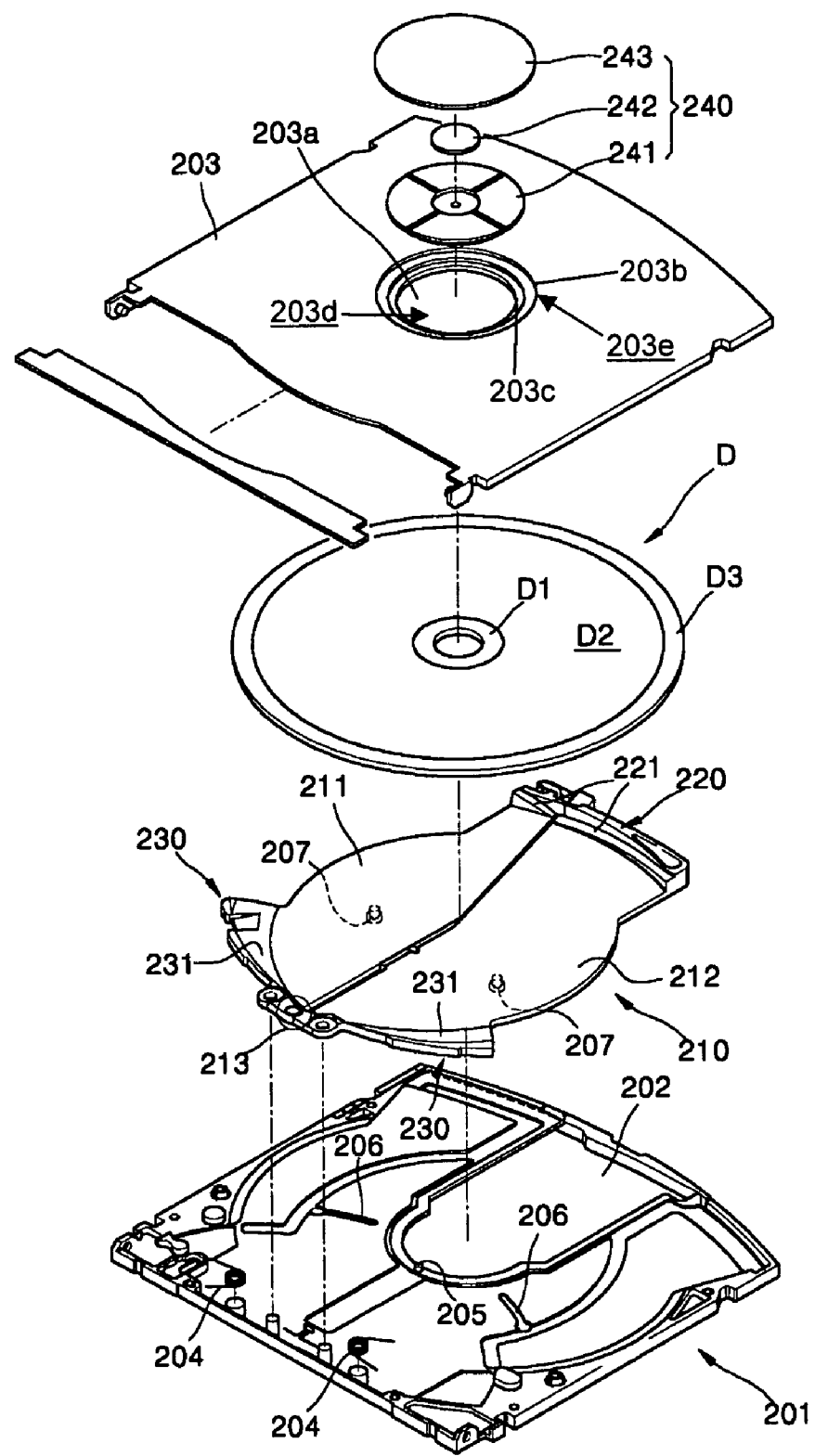
FIG. 3 is an exploded perspective view of a disk cartridge according to an embodiment of the present invention.
Figure 4:
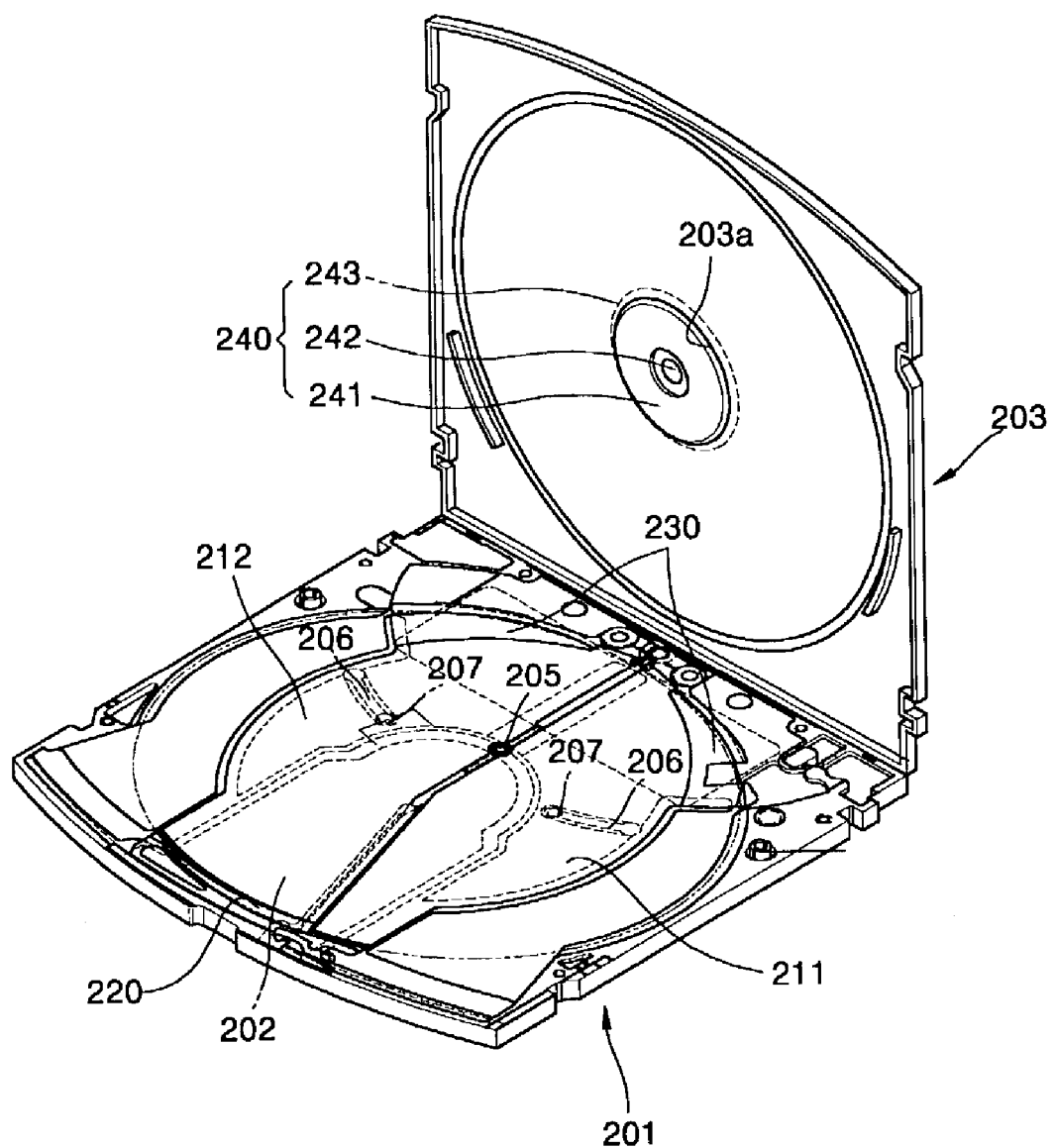
FIG. 4 is a perspective view showing an assembled state of the disk cartridge of FIG. 3.

FIGS. 3 and 4 show states in which a disk cartridge according to an embodiment of the present invention is disassembled and assembled, respectively. Referring to FIGS. 3 and 4, the disk cartridge includes a case 201 accommodating a disk D, a shutter 210 opening/shutting an opening 202 formed on the case 201 and disposed under the disk D, a cover 203 covering an upper surface of the case 201, and a clamping member 240 installed at the cover 203 to seal a hole 203a.

Here, the clamping member 240 has a first function of clamping the disk D like a clamper of a conventional disk drive and simultaneously has a second function of closely blocking the hole 203a. That is, in the present structure, a member having the first function of clamping the disk D with respect to the case 201 is installed at the cover 203, not at the disk drive, and simultaneously has the second function of sealing the hole 203a. A detailed description thereof will be described later.

Next, the shutter 210 is formed of first and second shutter portions 211 and 212 installed inside the case 201 to be capable of pivoting symmetrically. Thus, as the first and second shutter portions 211 and 121 pivot in first opposite directions in which they are separated apart from each other, the opening 202 is open (refer to FIG. 6). When the first and second shutter portions 211 and 121 pivot in second opposite directions in which they are close to each other, the opening 202 is closed (refer to FIG. 5). A connection portion 213 is formed to make the first and second shutter portions 211 and 212 interact with each other. Accordingly, as the first shutter portion 211 pivots, the second shutter portion 212 pivots in a direction symmetrically opposite to that of a rotation of the first shutter portion 211 with respect to the connection portion 213. A torsion spring 204 elastically biasing the first and second shutter portions 211 and 212 in the second opposite directions of closing the opening 202, is installed at a bottom surface of the case 201 and each of the first and second shutter portions 211 and 212. When a force applied by the opening lever 120 is removed, the shutter 210 returns to an original closed position according to an elastic force of the torsion spring 204.

As shown in FIG. 3, the shutter 210 is not symmetric. That is, the first shutter portion 211 has a first surface area, and the second shutter portion 212 has a second surface area different from the first surface area. The first shutter portion 211 and the second shutter portion have a center portion corresponding to a center hole of the disk D or the opening 202 of the case 201. The first and second shutter portions 211, 212 have first portions between the center portion and the connection portion 213 and second portions between the center portion and distal ends of the first and second shutter portions 211, 212 opposite to the connection portion 213 with respect to the center portion. The first portions may have the same surface area, but the second portions may be different in area. The second portions of the first shutter portion 211 and the second shutter portion meet at a line different from a center line passing through the center portion and the connection portion 213.

Figure 5:
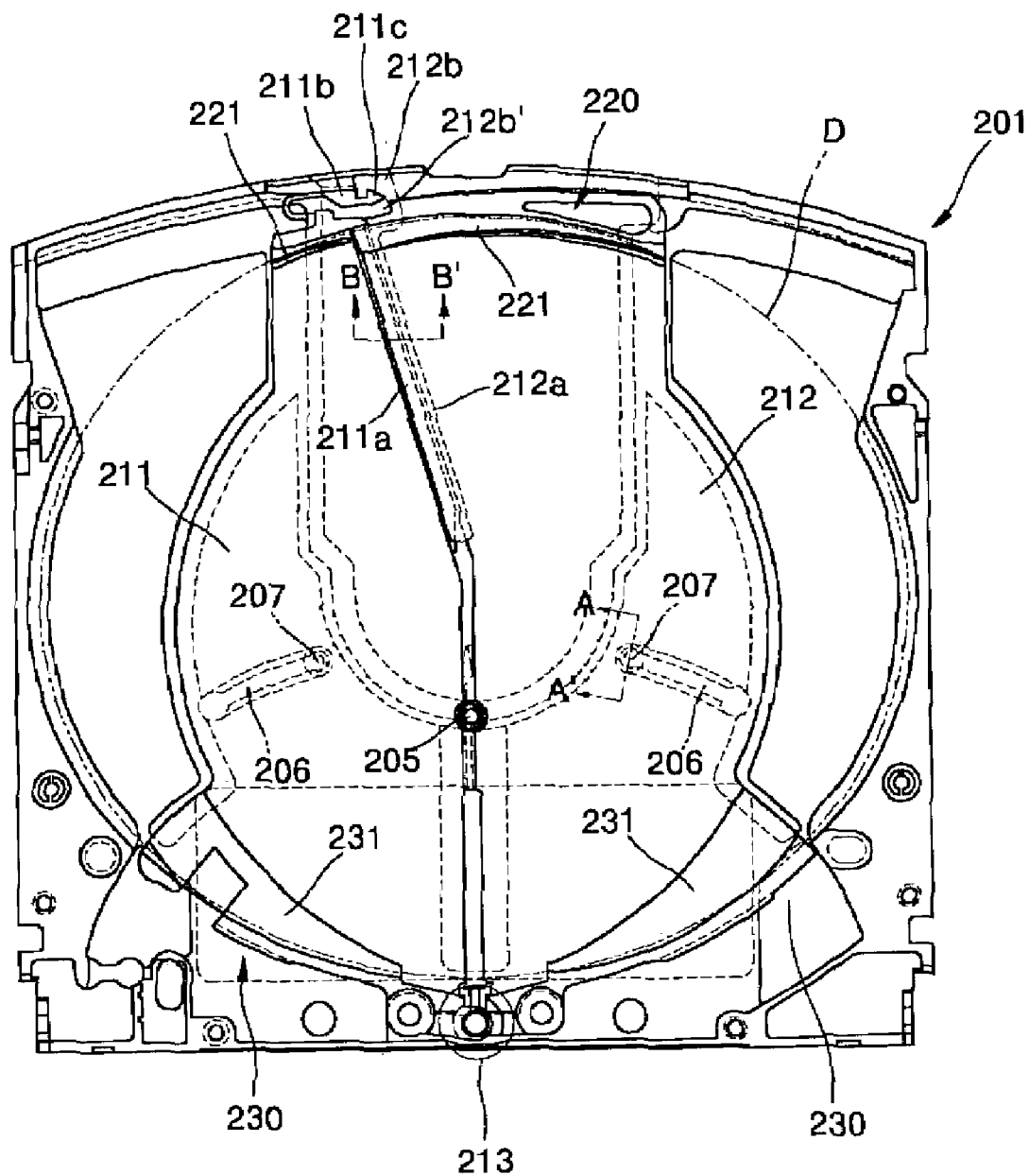
FIG. 5 is a plan view showing a closed state in which the shutter is closed in the disk cartridge of FIG. 3.
Figure 6:
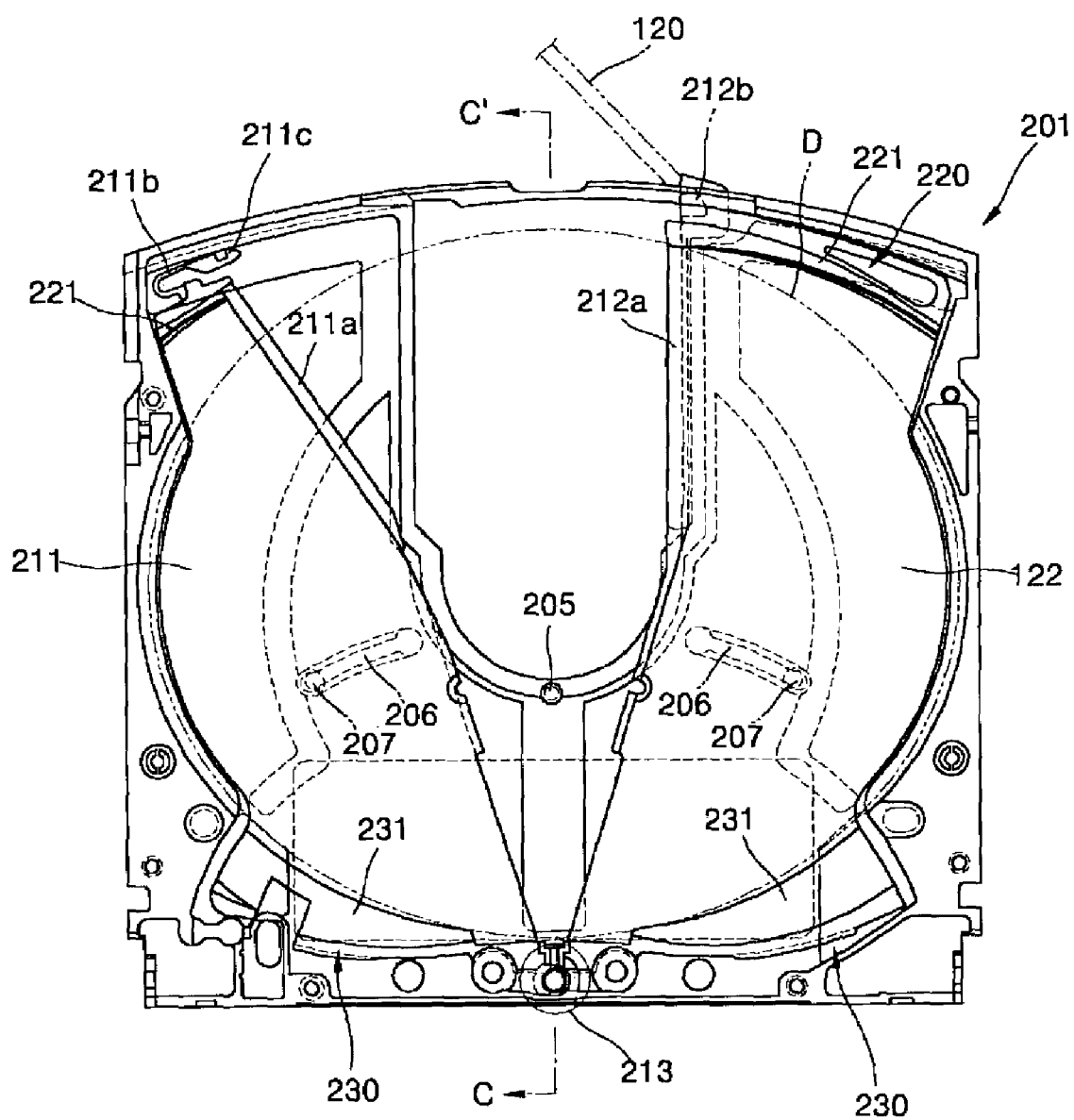
FIG. 6 is a plan view showing an open state in which the shutter is open in the disk cartridge of FIG. 3.

Protrusions 230 and 220 contacting an edge portion D3 of an outer circumference of the disk D are formed at the first and second shutter portions 211 and 212, respectively. That is, the disk D includes a clamping area D1 at the inner circumference, an information area D2 where information is recorded, and the edge portion D3 disposed outside the information area D2. Since the edge portion D3 is one of non-information areas and is supported by the protrusions 220 and 230, contact between the information area D2 and the shutter 201 can be avoided. The protrusions 220 and 230 have inclined surfaces 221 and 321 that are inclined toward a center of the accommodated disk D or a major surface of the shutter 210. Thus, as shown in FIG. 5, when the first and second shutter portions 211 and 212 are in a closed state, the edge portion D3 of the disk D is supported by upper ends of the inclined surfaces 221, 321 of the protrusions 220 and 230 of the shutter 210. When the first and second shutter portions 211 and 212 are in an open state, as shown in FIG. 6, the disk D is lowered along the inclined surfaces 221 and 231. The clamping area D1 of the lowered disk D at an inner circumference thereof is supported by a guide protrusion 205 formed at the case 201. As the shutter 210 is closed, the disk D is raised and the clamping member 240 closely contacts the clamping area D1 thereof as shown in FIG. 5.

The protrusions 230 of the first and second shutter portions 211 and 212 disposed close to the connection portion 213 may have the same shape, and the inclined surface 231 of the first and second shutter portions 211 and 212 may have the same area or the same inclined angle. To the contrary, the protrusions 220 of the first and second shutter portions 211 and 212 disposed opposite to the connection portion 213 with respect to the center portion may have a different shape, and the inclined surface 221 of the first and second shutter portions 211 and 212 may have a different area or a different inclined angle.

Figure 7:
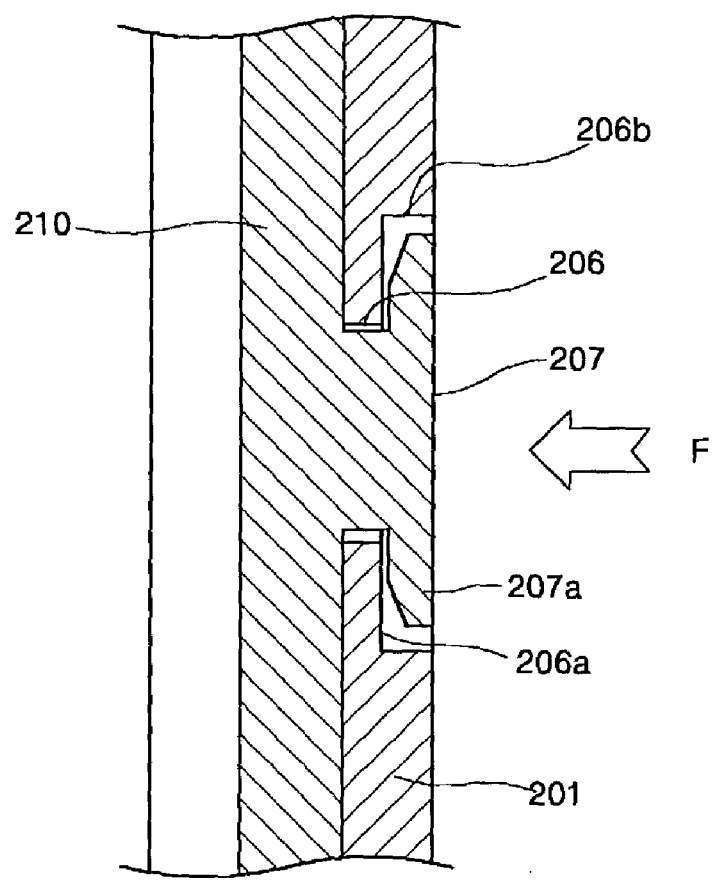
FIG. 7 is a sectional view taken along line A-A' of FIG. 5.

Also, a support member 207 is provided at a lower surface of each of the first and second shutter portions 211 and 212, that is an opposite surface to a surface where the disk D is disposed, so that the support member is inserted into a guide slot 206 formed on the case 201 to be capable of sliding along the guide slot 206. The guide slot 206 is formed along a track in which the support member 207 moves during a pivoting operation of the first and second shutter portions 211 and 212. Thus, during an opening/shutting operation of the first and second shutter portions 211 and 212, the support member 207 slides along the guide slot 206. An end portion 207a of the support member 207 inserted into the guide slot 206 is caught by a contact portion 206a of the guide slot 206 as shown in FIG. 7. Thus, when an external force is applied to the shutter 210 in a direction indicated by an arrow F, since the end portion 207a is caught by the contact portion 206a of the guide slot 206, the shutter 210 is prevented from being deformed inwardly in the case 201. Here, although the end portion 207a may be formed to protrude outward from the case 201, it is possible that an accommodation portion 206b connected to the guide slot 206 is formed in the case 207a so that the end portion 207a does not protrude above an outer surface of the case 201 as shown in FIG. 7.

Figure 8:
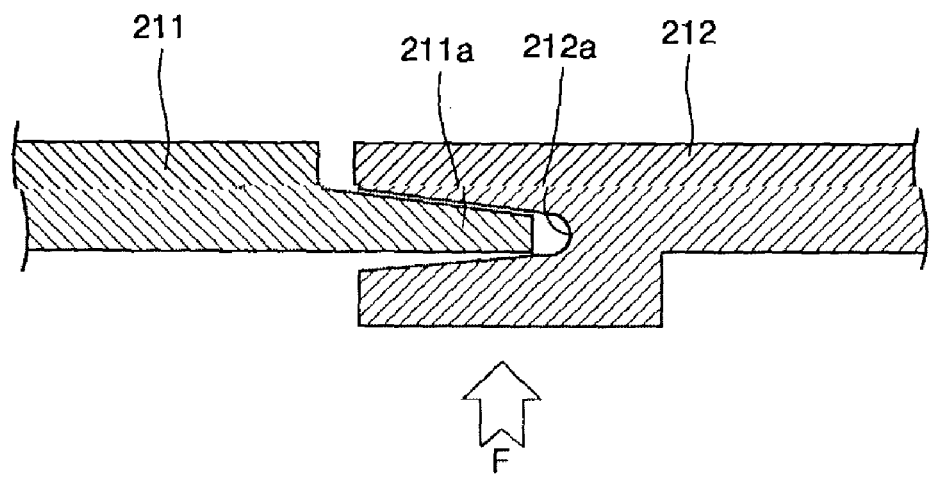
FIG. 8 is a sectional view taken along line B-B' of FIG. 5.

A coupling protrusion 211a and a coupling groove 212a coupled together are formed at the position where the first and second shutter portions 211 and 212 closely contact each other as shown in FIG. 8. When the first and second shutter portions 211 and 212 closely contact each other while closing the opening 202, the coupling protrusion 211a and a coupling groove 212a coupled to each other lowers possibility of deformation of the shutter 210 when the external force in the direction F is applied, compared to the opened state in which the first and second shutter portions 211 and 212 are separated with respect to the opening 202. Of course, the coupling protrusion 211b can be formed at the second shutter portion 212, and the coupling groove 211a can be formed at the first shutter portion 211.

Figure 10:
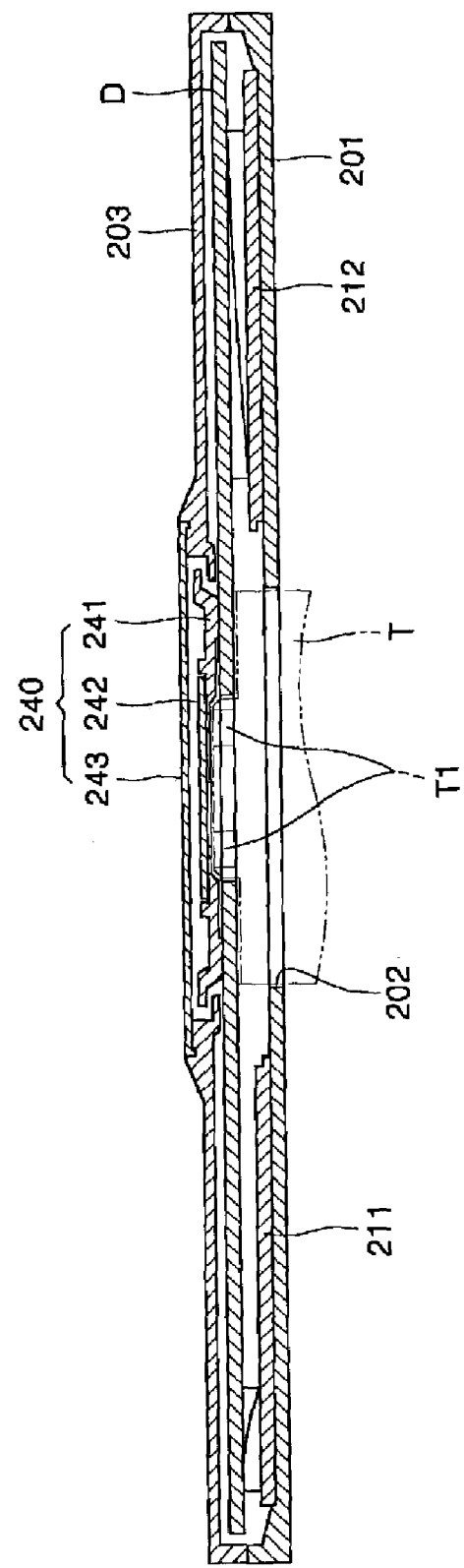
FIG. 10 is a view showing a clamping state in which a disk is clamped in the disk cartridge of FIG. 3.
Figure 11:
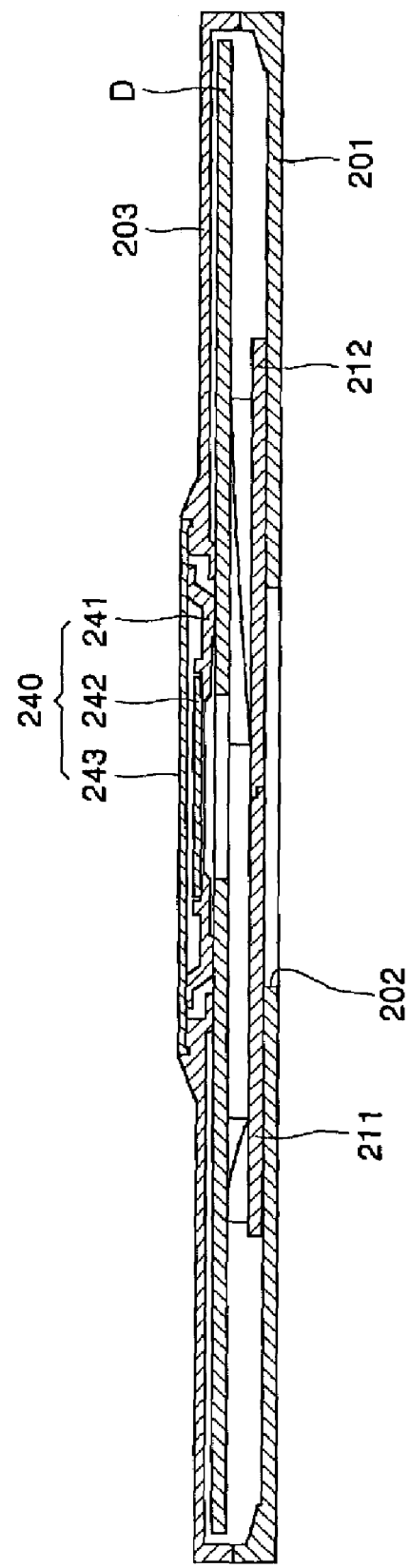
FIG. 11 is a view showing a state in which a clamping holder is clamped in the disk cartridge of FIG. 3.

The clamping member 240 prevents introduction of foreign materials, such as dust, by completely closing the hole 203a of the cover 203 and clamps the disk D if necessary. As shown in FIGS. 3 and 4, the clamping member 240 includes a clamping holder 241 supported by a second portion 203c of the cover 203 having an edge defining the hole 203a, a yoke 242 installed at the clamping holder 241 and within a space 203d between the clamping holder 241 and a clamp cover 243, the clamp cover 243 completely covering the hole 203a from above the clamping holder 241 at a first portion 203b of the cover 203 having an edge defining an upper portion 203e of the hole 203a. Thus, since the hole 203a is completely sealed by the clamping member 240, the dust cannot be introduced into an inside of the disk cartridge through the hole 203a. To exchange the disk D, the cover 203 is open, and the disk D is replaced with a new disk as shown in FIG. 4. When the disk D in the case 201 is raised, the clamping holder 241 closely contacts the clamping area D1 of the disk D as shown in FIG. 11. The disk D is raised along the inclined surfaces 221 and 231 as the first and second shutter portions 211 and 212 are in the closed state as shown in FIG. 11. Also, the disk D is raised, as shown in FIG. 10, when a turntable T enters through the opening 202 to perform a recording/reproducing process in the disk drive so that the disk D disposed on the turntable T is raised. Here, a magnetic attraction is generated between the yoke 242 and a magnet T1 installed at the turntable T which serves as a force to clamp the disk D.

The disk cartridge further includes a locking piece 211b provided at the first shutter portion 211 and a locking hook 211c that is elastically coupled to a locking groove 212b' formed in a locking protrusion 212b of the second shutter portion 212 when the opening 202 is closed.

Figure 9:
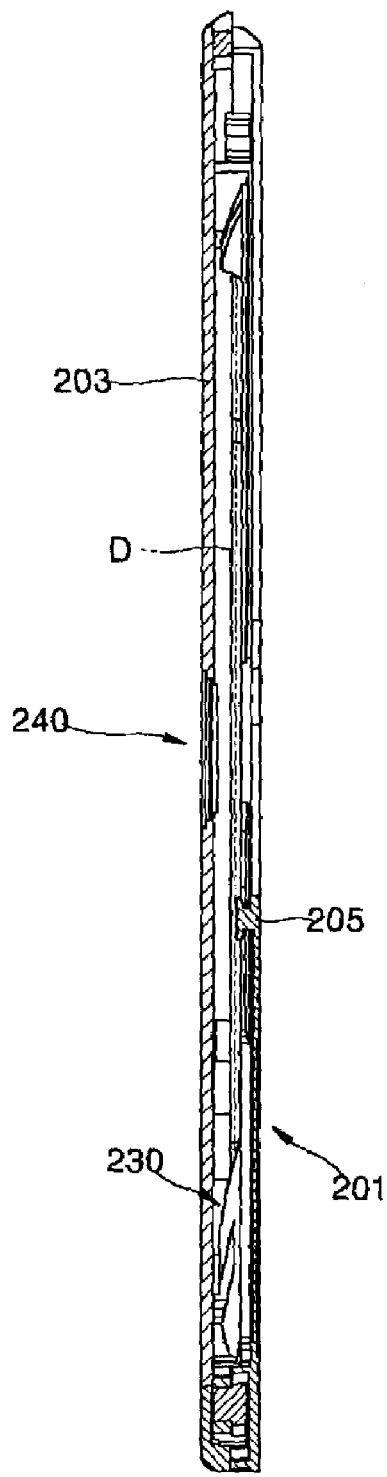
FIG. 9 is a sectional view taken along line C-C' of FIG. 6.

The disk cartridge having the disk D installed therein enters the disk drive in a state in which the shutter 210 and the cover 203 are all closed as shown in FIG. 5. Here, all passages through which the dust can be introduced inside the disk cartridge are all blocked. When the disk cartridge enters the disk drive, as shown in FIG. 6, an opening lever 120 installed the disk drive pushes the locking piece 211b to unlock the locking hook 211c from the locking groove 212b' and pushes the locking protrusion 212b where the locking groove 212b' is formed, and thus the second shutter portion 212 pivots in a clockwise direction with respect to the connection portion 213 on the drawing. Then, the first shutter portion 211 pivots in a counterclockwise direction by being engaged with each other through the connection portion 213. Accordingly, the opening 202 is open between the first and second shutter portions 211 and 212. However, since the protrusions 230 and 220 of the first and second shutter portions 211 and 212 only contact the disk D, and since a contact area between the disk D and the shutter 210 is limited to the edge portion D3 of the disk D that is a non-information area, the information area of the recording surface of the disk D is hardly damaged during the opening/shutting operation of the shutter 201. As the shutter 210 is open, the disk D is lowered along the inclined surfaces 221 and 231 of the protrusions 220 and 230 and are temporarily supported by an upper surface of the guide protrusion 205 and the inclined surfaces 221 and 231 as shown in FIGS. 6 and 9. In this state, a turntable T (shown in FIG. 10) driving the disk D of the disk drive enters the opening 202 and clamps the disk D supported by the guide protrusion 205 and the inclined surfaces 221 and 231 against the clamping member 240 as shown in FIG. 10. Then, the turntable rotates, and the recording/reproducing operation is performed with respect to the disk D.

To the contrary, when the recording/reproducing operation is completed, the turntable is lowered to be spaced-apart from the disk cartridge, and the clamping of the disk D against the clamping member 240 is removed. The non-information areas D1 and D3 of the disk D are supported by the guide protrusion 205 and the inclined surfaces 221 and 231, respectively. In this state, the disk cartridge is drawn from the disk drive, the first and second shutter portions 211 and 212 return to their original positions so that the opening 202 is closed. Here, the edge portion D3 of the outer circumference of the disk D is raised along the inclined surfaces 221 and 231 of the protrusions 220 and 230 to move back to the closed state shown in FIG. 5. Since a shutting operation and an opening operation are performed while the shutter 210 does not contact the information area D2, the information area D2 can be safely kept. Also, in this state, the disk D rises along the inclined surfaces 221 and 231 and pushes the clamping holder 241 supported by the edge portion of the hole 203a to closely contact the clamp cover 243 as shown in FIG. 11. That is, the clamping holder 241 is clamped between the disk D and the cover 243. Thus, since the clamping holder 241 is not moved, a phenomenon that the clamping holder 241 bumps against other elements, such as the cover 203 and the clamp cover 243, in the disk cartridge to make a noise can be prevented.

In the state in which the shutter 210 is closed, since the coupling protrusion 211a, and the coupling groove 212a of the first and second shutter portions 211 and 212 are coupled so that the end portion 207a of the support member 207 is caught by the contact portion 206a of the guide slot 206, even when the shutter 210 is pressed inwardly into the case 201 through the opening 202, the shutter 210 is not pushed. Thus, the deformation of the shutter 210 due to the external force is prevented, and the closed state of the opening 202 can be firmly maintained.

Figure 12:
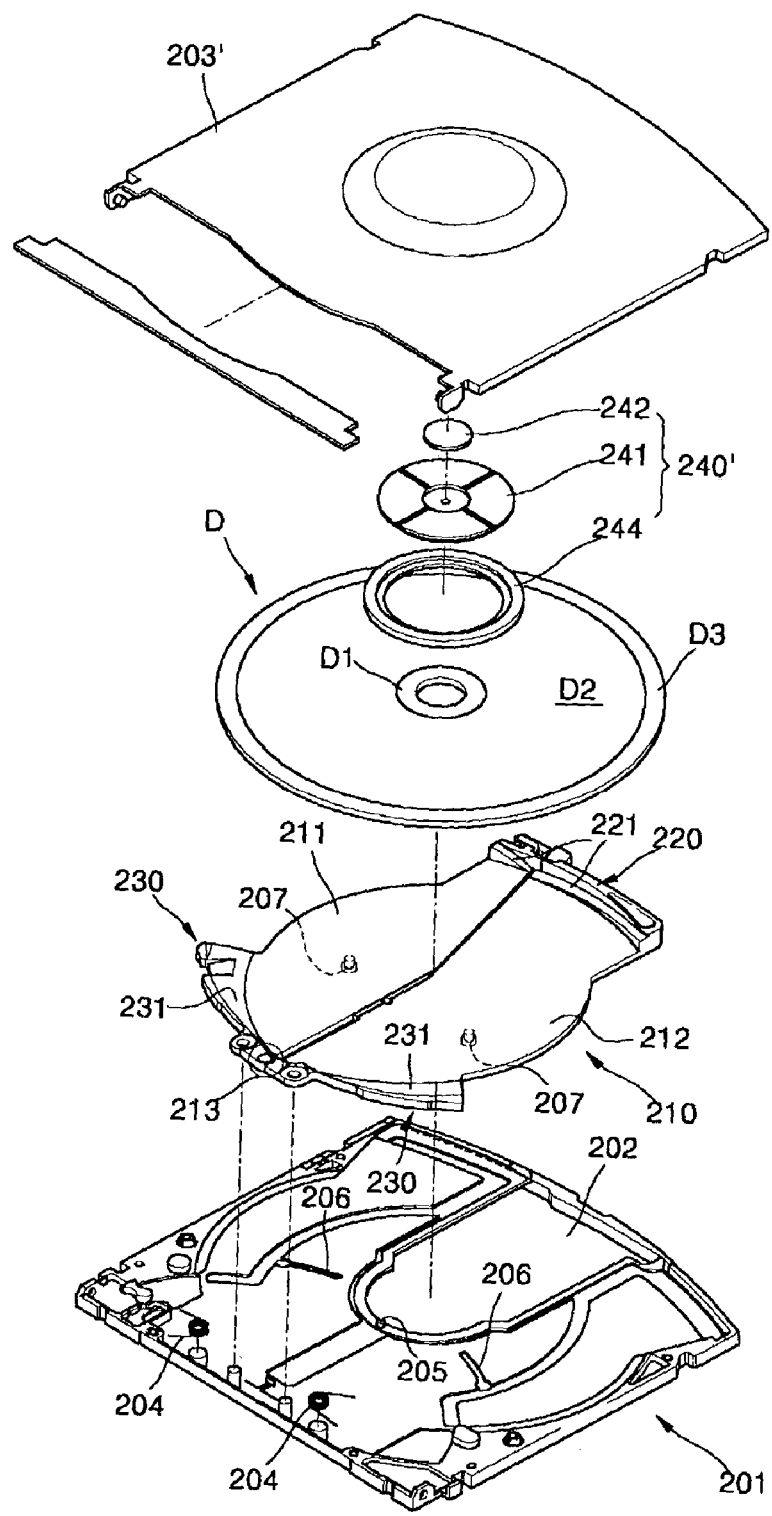
FIG. 12 is an exploded perspective view of a disk cartridge according to another embodiment of the present invention.
Figure 13:
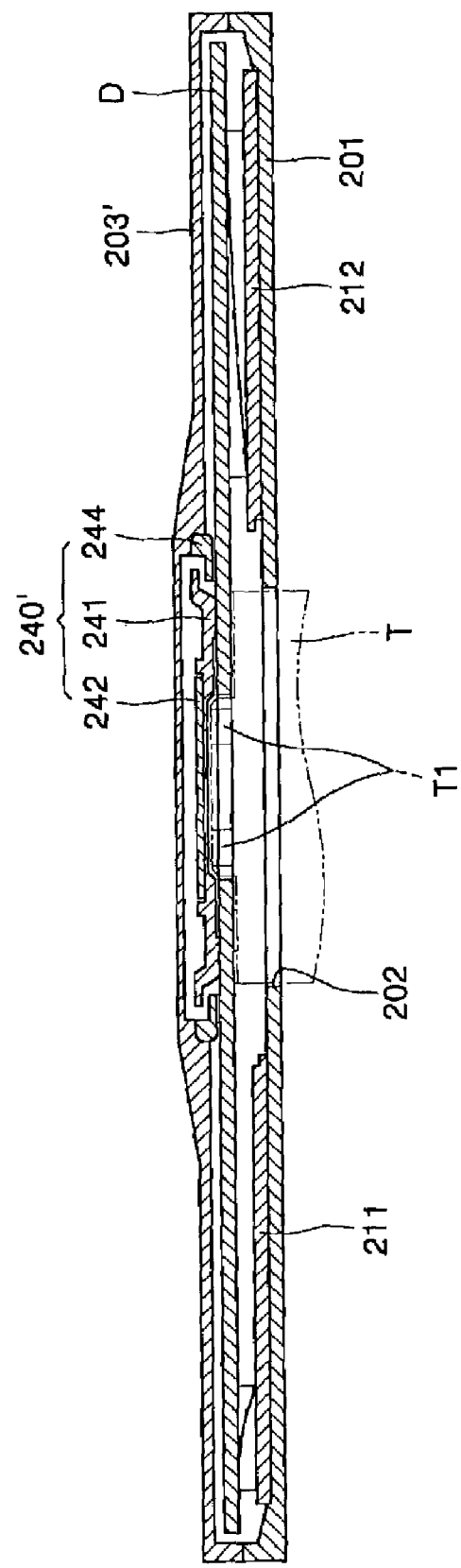
FIG. 13 is a view showing a clamp state in which a disk is clamped in the disk cartridge of FIG. 12.
Figure 14:
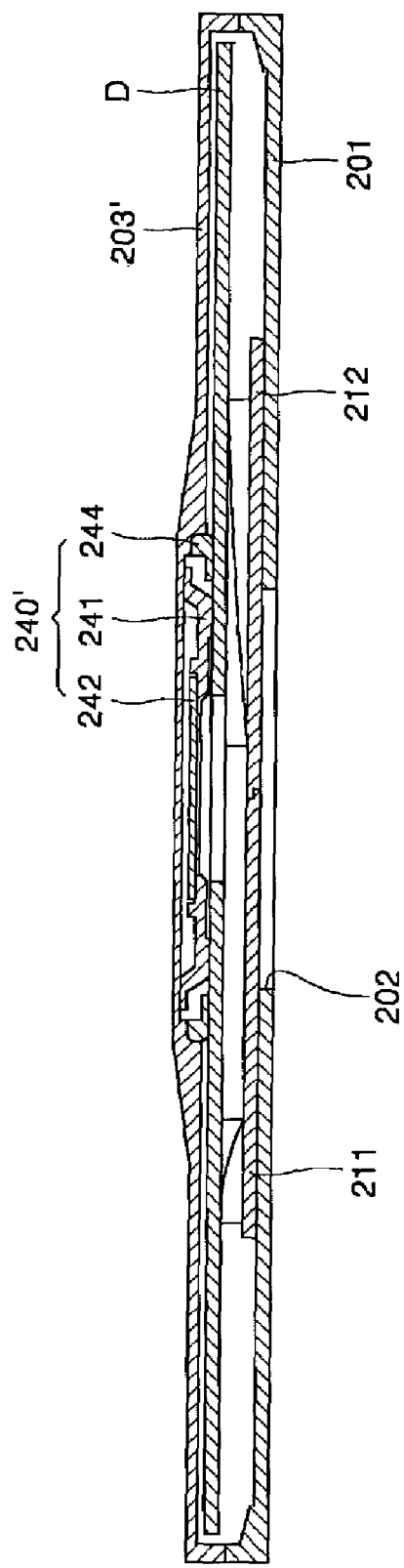
FIG. 14 is a view showing another state in which a clamping holder clamps the disk in the disk cartridge of FIG. 12.

Next, FIGS. 12 through 14 show a disk cartridge according to another embodiment of the present invention. Here, the same reference numerals indicate the same members having the same functions.

As shown in the drawings, the disk cartridge of shown in FIGS. 12-14 has the structure similar to that of the previous embodiment shown in FIGS. 3-11. However, there is no hole, such as the hole 203a of FIG. 3, in a cover 203'. A clamping member 240' is installed at an inner surface of the cover 203'. That is, in the present embodiment, since a hole through which the dust can be introduced into the disk cartridge is not formed in the cover 203' at all, a completely closed state is maintained at a side of the cover 203'. Since the cover 203' has no hole, the clamping member 240' is installed at the inner surface of the cover 203'. The clamping member 240' includes the yoke 242, the clamping holder 241, and a ring member 244 attached to the inner surface of the cover 203'. The clamping holder 241 is supported by the ring member 244 when contacting an edge portion of the ring member 244.

When the disk cartridge having the above structure is loaded in the disk drive and a recording/reproducing process is performed, as shown in FIG. 13, the disk D is clamped between the turntable T and the clamping holder 241. When the disk cartridge is unloaded from the disk drive, as shown in FIG. 14, the clamping holder 241 is clamped between the disk D and an inner surface of the cover 203'.

Thus, with the disk cartridge in the preferred embodiment, introduction of the dust through the cover 203' can be fundamentally prevented. Other functions including the opening/shutting of the shutter are the same as those described in the previous embodiment.

As described above, the disk cartridge according to the present invention has the following effects and advantages.

First, by blocking the hole of the cover from the outside of the cover, the introduction of the dust is prevented so that the possibility of contamination of the recording surface of the disk can be reduced.

Second, since the clamping member is installed at the cartridge, the disk drive can be made simplified and slim.

Third, since the end portion of the support member is caught in the contact portion of the guide slot, deformation of the shutter due to the external force can be prevented, and the closed state of the shutter can be firmly maintained.

Fourth, since the shutter movably disposed in the case is formed to contact only the non-information area of the disk, during the opening/shutting operation of the opening, the information area of the disk can be safely kept.

Fifth, since the cover is installed at the case to be capable of being open and shut, the disk can be easily replaced.

Although a few preferred embodiments of the present invention have been shown and described, the present invention is not limited to the above descriptions and drawings, and it would be appreciated by those skilled in the art that changes may be made in this embodiment without departing from the principles and sprit of the invention, the scope of which is defined in the claims and their equivalents.

What is claimed is:

1. A disk cartridge comprising:
    a case accommodating a disk and having an opening;
    a cover installed at on the case to be opened and shut, and having an edge portion defining a hole formed therein open to an outside of the cover;
    a shutter movably installed on the case between the disk and the case to open/shut the opening formed on the case; and
    a clamping member installed at on the cover to seal the hole and clamp the disk, wherein the disk cartridge is inserted into a disk drive having a turntable rotating the disk, and the clamping member comprises:
    a clamping holder contacting and supporting the edge portion of the hole of the cover;
    a magnetic body installed on the clamping holder to apply a magnetic attraction to the turntable of the disk drive; and
    a clamp cover sealing the hole and covering the clamping holder, and, wherein the shutter comprises:
    a protruding portion protruding from a major surface of the shutter to support a non-information area disposed on an outer circumference of the disk; and
    an inclined surface formed on the protrusion portion and inclined at a predetermined angle with respect to the disk so that, when the shutter is open, the disk is lowered along the inclined surface, and, when the shutter is closed, the disk is raised along the inclined surface to closely contact the cover.

2. A disk cartridge comprising:
    a case accommodating a disk and having an opening;
    a cover installed at on the case to be opened and shut, and having an edge portion defining a hole formed therein open to an outside of the cover;
    a shutter movably installed on the case between the disk and the case to open/shut the opening formed on the case; and
    a clamping member installed on the cover to seal the hole and clamp the disk, wherein the shutter comprises:
    first and second shutter portions opening/shutting the opening while being closed or separated from each other;
    a coulping groove formed at one of the first and second shutter portions; and
    a coulping protrusion formed at the other one of the first and second shutter portions to be coupled to the coupling groove, so that, as the coupling protrusion and the coupling groove are coupled together, the coupling protrusion is inserted into the coupling groove.

3. A method in a disk player clamping and rotating a disk, the method comprising:
    receiving a disk cartridge including a case having an opening formed on a first side of the case, a cover movably installed on the case to open/shut a second side of the case opposite to the first side of the case, a shutter installed on the case between the cover and the second side of the case to open/shut the opening of the first side of the case, and a clamping member installed at the cover to clamp the disk disposed between the cover and the shutter;
    opening/shutting the shutter to open/shut the opening of the case using an opening lever when the disk cartridge is inserted into or removed from the disk player;
    inserting a turntable toward the clamping member through the opening of the case when the shutter is opened by the opening lever; and clamping the disk using the clamping member and the turntable to rotate the disk, wherein the shutter of the disk cartridge comprises first and second shutter portions moving to open/shut the opening of the case, and the opening/shutting of the shutter comprises:

moving the first and second shutter portions at the same angle with respect to a line at which the first and second shutter portions meet.

4. A method in a disk player clamping and rotating a disk, the method comprising:

receiving a disk cartridge including a case having an opening formed on a first side of the case, a cover movably installed on the case to open/shut a second side of the case opposite to the first side of the case, a shutter installed on the case between the cover and the second side of the case to open/shut the opening of the first side of the case, and a clamping member installed at the cover to clamp the disk disposed between the cover and the shutter;

opening/shutting the shutter to open/shut the opening of the case using an opening lever when the disk cartridge is inserted into or removed from the disk player;

inserting a turntable toward the clamping member through the opening of the case when the shutter is opened by the opening lever; and clamping the disk using the clamping member and the turntable to rotate the disk, wherein the shutter of the disk cartridge comprises first and second shutter portions moving to open/shut the opening of the case, and the opening/shutting of the shutter comprises:

moving the first and second shutter portions in opposite directions.

5. A method in a disk player clamping and rotating a disk, the method comprising:

receiving a disk cartridge including a case having an opening formed on a first side of the case, a cover movably installed on the case to open/shut a second side of the case opposite to the first side of the case, a shutter installed on the case between the cover and the second side of the case to open/shut the opening of the first side of the case, and a clamping member installed at the cover to clamp the disk disposed between the cover and the shutter;

opening/shutting the shutter to open/shut the opening of the case using an opening lever when the disk cartridge is inserted into or removed from the disk player;

inserting a turntable toward the clamping member through the opening of the case when the shutter is opened by the opening lever; and clamping the disk using the clamping member and the turntable to rotate the disk, wherein the shutter of the disk cartridge comprises protrusions having inclined surfaces, and the opening/shutting of the shutter comprises:

causing the disk to descend/ascend along the inclined surfaces of the protrusions.

6. The method of claim 5, wherein the causing of the disk to descend/ascend comprises:

moving the disk in a direction between the cover and a major surface of the shutter while maintaining the disk parallel to one of the shutter and the first side of the case.

\* \* \* \* \*

UNITED STATES PATENT AND TRADEMARK OFFICE
CERTIFICATE OF CORRECTION

PATENT NO. : 7,263,706 B2 Page 1 of 1
APPLICATION NO. : 10/367739
DATED : August 28, 2007
INVENTOR(S) : Hong-kyun Yim et al.

It is certified that error appears in the above-identified patent and that said Letters Patent is hereby corrected as shown below:

Title Page,
Item (73) Assignee,
insert --Matsushita Electric Industrial Co., Ltd., Osaka (JP)-- after "Samsung Electronics Co., Ltd., Suwon-si (KR)".

Signed and Sealed this

Twenty-ninth Day of April, 2008

JON W. DUDAS
*Director of the United States Patent and Trademark Office*